(12) United States Patent
Kapoor

(10) Patent No.: US 6,889,259 B2
(45) Date of Patent: *May 3, 2005

(54) METHOD AND APPARATUS FOR PROVIDING AN INTERNET PROTOCOL ADDRESS WITH A DOMAIN NAME SERVER

(75) Inventor: Rupesh Kapoor, Mountain View, CA (US)

(73) Assignee: Quote LLC, Wilmington, DE (US)

( * ) Notice: Subject to any disclaimer, the term of this patent is extended or adjusted under 35 U.S.C. 154(b) by 634 days.

This patent is subject to a terminal disclaimer.

(21) Appl. No.: 09/783,845

(22) Filed: Feb. 14, 2001

(65) Prior Publication Data

US 2003/0037143 A1 Feb. 20, 2003

Related U.S. Application Data

(63) Continuation of application No. 09/225,194, filed on Jan. 5, 1999, now Pat. No. 6,205,489, which is a continuation of application No. 08/850,782, filed on May 2, 1997, now Pat. No. 5,884,038.

(51) Int. Cl.$^7$ ............................................... G06F 13/00
(52) U.S. Cl. ....................................................... 709/245
(58) Field of Search ............................. 707/1, 3, 5, 10, 707/200; 709/200, 201, 203, 217, 219, 227, 245, 100, 101, 105; 718/100, 101, 105

(56) References Cited

U.S. PATENT DOCUMENTS

| | | |
|---|---|---|
| 5,434,974 A | 7/1995 | Loucks et al. |
| 5,483,652 A | 1/1996 | Sudama et al. |
| 5,550,984 A | 8/1996 | Gelb |
| 5,603,029 A | 2/1997 | Aman et al. |

OTHER PUBLICATIONS

Boyle, Padraic, Web Site Traffic Cops; Load balancers can provide the busiest Web sites with nonstop performance; PC Magazine Online; http://www.zdnet.com/pcmag/features/loadbal/_open.htm; Feb. 18, 1997; 9 pages.

Yerxa, Greg; Web Server Balancing: An Act Worth Watching; Network Computing Online; http://techweb.cmp.com/nc/814/814ws1.html; Jun. 24, 1998; 3 pages.

Primary Examiner—Robert B. Harrell
(74) Attorney, Agent, or Firm—Blakely, Sokoloff, Taylor & Zafman LLP (57) ABSTRACT

A method for providing Internet protocol (IP) addresses with a domain name server (DNS) for multiple web servers of an Internet host. In one embodiment, each web server of an Internet host having multiple web servers is assigned a relative weight based on the individual processing power of the particular web server. As DNS resolution requests are received from client domains, the DNS returns IP addresses for the web servers such that the total number of times that each IP address of the web server is returned is proportional to the relative weight of each server relative to the total weight of all the servers. In another embodiment, the client domains that have most frequently accessed the web servers according to recent web server access logs are identified. In addition, the total number of accesses of each client domain is considered such that static arrays may be constructed to apportion the web servers among the client domains that most frequently access the web servers. As such, each of the client domains that most frequently access the web servers are assigned to a particular web server such that the percentage of requests served by each particular web server is proportional to the relative weight of that web server. In doing so, the probability of a load imbalance between the web servers is reduced.

20 Claims, 9 Drawing Sheets

METHOD AND APPARATUS FOR PROVIDING AN INTERNET PROTOCOL ADDRESS WITH A DOMAIN NAME SERVER

This application is a continuation pursuant to 37 C.F.R. § 1.53(b) of application "IMPROVED METHOD FOR PROVIDING AN INTERNET PROTOCOL ADDRESS WITH A DOMAIN NAME SERVER", Ser. No. 09/225,194 filed Jan. 5, 1999, now U.S. Pat. No. 6,205,489, which is a continuation pursuant to 37 C.F.R. § 1.53(b) of application "IMPROVED METHOD FOR PROVIDING AN INTERNET PROTOCOL ADDRESS WITH A DOMAIN NAME SERVER", Ser. No. 08/850,782 filed May 2, 1997 now U.S. Pat. No. 5,884,038.

BACKGROUND OF THE INVENTION

1. Field of the Invention

The present invention relates generally to the Internet and, more specifically, the present invention relates to Internet addressing.

2. Background Information

The Internet has brought about an information revolution through the development of computerized information resources, on-line services and the World Wide Web (WWW). With enormous amounts of data on almost any topic imaginable available on the Internet, an ever increasing number of computers and users have been connected to the Internet.

Computers on the Internet address each other with a unique Internet protocol (IP) addresses. Since it is generally easier to memorize words and phrases than it is to remember long sequences of numbers, domain name servers (DNS) perform the important task of converting a host name, such as for example "www.whowhere.com," to an IP address, such as for example "205.230.1.5."

Figure 1:
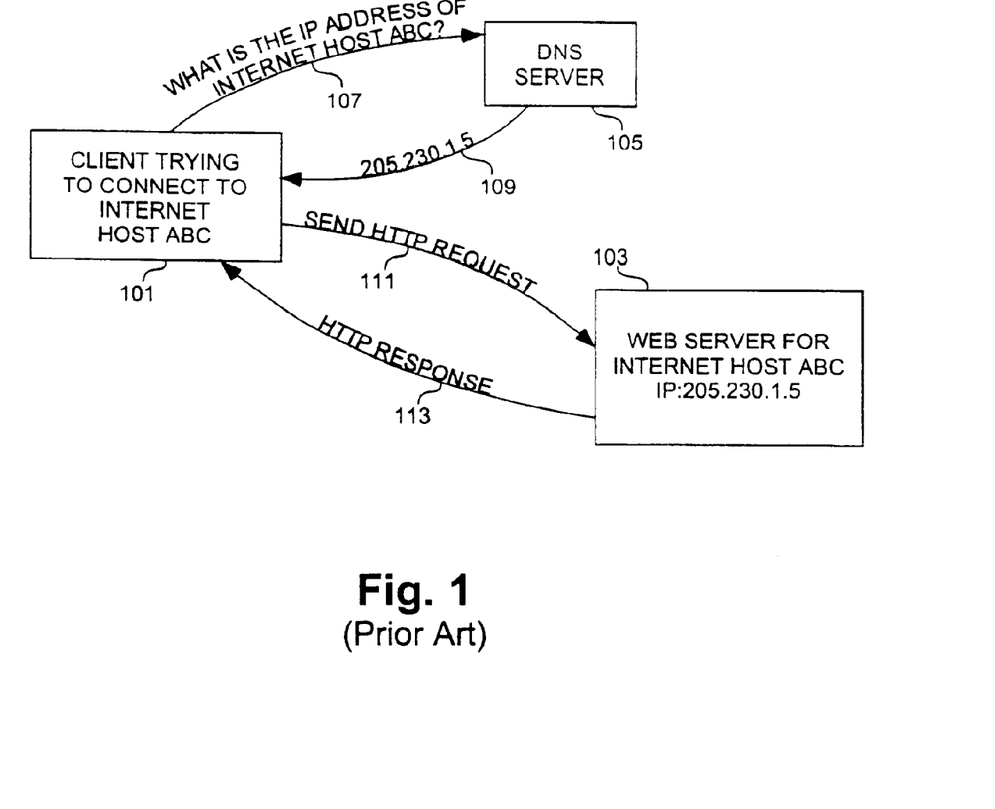
FIG. 1 is a block diagram of a DNS server providing an IP address to a client for an Internet host that includes one web server.

FIG. 1 is a block diagram that illustrates a client 101 trying to connect to a web server 103 of an Internet Host ABC. As shown in FIG. 1, client 101 makes a DNS resolution request 107 to DNS server 105 to request the IP address of web server 103. DNS server 105 returns the IP address response 109 in reply to the DNS resolution request 107. After client 101 has received the IP address response 109 of web server 103, client 101 sends the hypertext transfer protocol (HTTP) request 111 to web server 103, which is addressed by IP address included in IP address response 109, and web server 103 therefore responds with an HTTP response 113 as shown in FIG. 1.

Although there is a vast number of Internet or WWW sites around the globe, a considerable amount of Internet traffic is served by a small proportion of those sites. As a result, it is desirable for these Internet of WWW sites to have high reliability as well as fast response times. As such, many Internet sites run multiple web servers that serve identical content. By distributing the workload between multiple web servers, an overall site can generally handle more requests than a single web server, each of which has a unique IP address, and the failure of a single web server may not necessarily result in the entire site of an Internet host being down.

Figure 2:
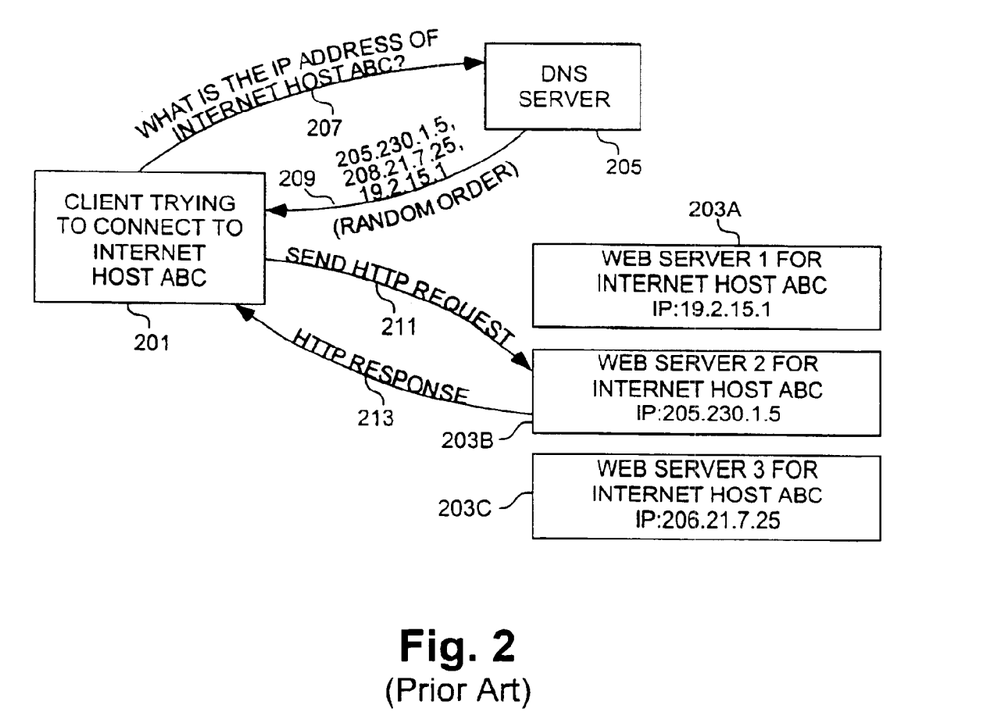
FIG. 2 is an illustration of a DNS server providing a list IP addresses in random order to a client for an Internet host with multiple web servers.

FIG. 2 is a block diagram illustrating a client 201 trying to connect to one of the web servers 203A–C of Internet Host ABC. One approach for client 201 to connect to one of the individual web servers 203A–C would be for the user or client to remember multiple host names for each of the web servers 203A–C. To illustrate, web server 203A could have a host name "www1.Internet_Host_ABC.com," web server 203B could have a host name "www2.Internet_Host_ABC.com" and server 203C could have a host name "www3.Internet_Host_ABC.com." When a user desires to connect to one of the web servers 203A–C, the user could use any one of the unique host names. However, since it is undesirable to require a user to memorize different host names for each of the individual web servers of an Internet host, DNS server 205 associates multiple servers, and therefore multiple IP addresses, with a single host name. Thus, when the user, or client 201 makes a DNS resolution request 207 to DNS server 205 for a host name to IP address translation, DNS server 205 returns all IP addresses in IP address response 209 for the host name in random order. In general, client 201 usually uses the first IP address.

In the example illustrated in FIG. 2, DNS server 205 returns three IP addresses in IP address response 209 in random order. Each IP address corresponds to one of the web servers 203A–C. Client 201 uses the first IP address and sends and HTTP request 211 to the web server 203B identified by the first IP address returned by DNS server 205. In response, web server 203B returns an HTTP response 213 back to client 201.

DNS interactions such as DNS resolution requests 107 and 207 as well as IP address responses 109 and 209 of FIGS. 1 and 2 respectively constitute a significant portion of total Internet traffic. As a result, some clients 101 or 201 generally cache the Internet host name to IP address translation for a period of time. This concept is sometimes referred to as DNS caching. Several issues are considered when determining the length of time a client should cache an Internet host name to IP address translation. A shorter cache time, sometimes referred to as time-to-live (TTL), leads to increased DNS traffic and slower response times since a client makes a greater number of DNS resolution requests 107 and 207 as shown in FIGS. 1 and 2 respectively. Longer TTL times may result in a "skewed locking" problem. Skewed locking is generally undesirable and occurs when a disproportionate amount of Internet clients address the same individual web server of an Internet site, even though the Internet site may employ multiple servers.

To illustrate, some of the largest client domains, or Internet service providers (ISPs), together constitute nearly two-thirds of the total Internet traffic. These large client domains cache DNS translations for TTL amount of time. Since existing DNS implementations return IP addresses in random order, as shown in FIG. 2, it is possible that all of the major ISPs receive the same sequence of IP addresses for a particular host. Consequently, an undesirable load imbalance results between the multiple web servers of the Internet host. Referring to FIG. 2, one web server 203B may be heavily burdened with HTTP requests 211 while the other web servers 203A and 203C remain idle. Consequently, web servers 203A–C are not efficiently utilized and overall Internet traffic and response times are compromised as a result.

Thus, what is desired is an improved method for providing IP addresses for the multiple web servers of an Internet host. Such a method would efficiently utilize the multiple web servers of an Internet host as well as reduce the skewed locking problems such that overall Internet traffic and response times are reduced.

SUMMARY OF THE INVENTION

A method for providing IP addresses of web servers with a DNS is described. In one embodiment, a DNS is configured to receive a DNS resolution request from a client domain and the DNS returns the IP address of one of the web servers of the Internet host such that the total number of times that the IP address of each particular web server is returned is proportional to the relative weight of each respective web server relative to the total weight of all the web servers of the Internet host. In another embodiment, the top client domains that have recently requested to be connected to the web servers are identified. The number of times each one of the top client domains have requested to be connected to the web servers is also determined. Each of the identified top client domains are then apportioned among the web servers of the Internet host such that the percentage of requests served by each one of the web servers is proportional to the relative weight of each respective web server. A DNS resolution request may then be received from one of the client domains and the DNS then returns the IP address of the web server to which that particular client domain was apportioned. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

An improved method for providing IP addresses with a DNS for Internet hosts with multiple servers is disclosed. In the following description numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention.

Several embodiments of the present invention include various steps, which will be described below. The steps may be embodied in machine-executable instructions, which may be used to cause a general-purpose or special-purpose processor programmed with the instructions to perform the steps. Alternatively, the steps of the present invention may be performed by specific hardware components that contain hardwired logic for performing the steps, or by any combination of programmed computer components and custom hardware components.

One embodiment of the present invention provides an improved method for providing IP addresses by modifying existing DNS servers, and without any changes to clients, to solve the problems associated with present day DNS servers. In one embodiment, a DNS server capable of balancing the workload between multiple web servers in a fault tolerant and reliable way is described. The DNS has the ability to adapt to varying loads between client domains and ISPs. Instead of returning the IP addresses in a random order in response to a DNS resolution request, a DNS in accordance with one embodiment of the present invention returns IP addresses in such a way that all web servers of an Internet host roughly get their "fair share," thereby reducing DNS traffic at the same time.

In another embodiment, the system administrator of an Internet host specifies a list of IP addresses for the web servers of the Internet host and their relative strengths.

In yet another embodiment, the DNS server monitors the access logs for the past several days to identify the client domains that most frequently access the Internet host and the percentage of accesses from each of the client domains. Static arrays, lists or tables are constructed by one embodiment of the present invention to assign an IP address to the client domains that most frequently access the Internet host. As long as all the web servers are operational, the DNS sends back the assigned IP address to these client domains. A weighted random IP address is returned to other client domains that are not considered to have frequently accessed the Internet host recently. If one of the web server crashes or otherwise becomes unavailable, the static arrays are recomputed.

In one embodiment a system administrator initially specifies the relative processing power of the multiple servers of an Internet host that serve similar content. Table 1 below show and example of an Internet host ABC with three web servers, each of which has a relative weight and a unique IP address.

TABLE 1

| Web Server | IP Address | Relative Weight |
|---|---|---|
| www1.Internet_Host_ABC.com | 19.2.15.1 | 6 |
| www2.Internet_Host_ABC.com | 205.230.1.5 | 7 |
| www3.Internet_Host_ABC.com | 206.21.7.25 | 7 |

As shown in Table 1, the first web server has a relative weight of 6 and the second two web servers have a relative weight of 7. It is appreciated that the present invention is not limited to an Internet host having only three web servers or web servers having relative weights as shown. The example given above is for illustration purposes only and the present invention may also be applied to Internet hosts having greater or fewer web servers and different relative weights. It is noted that the system administrator may use discretion in assigning the relative weights based on any number of factors. In one embodiment, the relative weights are assigned according to the relative processing power of each particular web server.

In one embodiment, the present invention provides IP addresses to client domains requesting an IP address based on the relative weights of each particular web server such that the workload is balanced between each of the web servers. In one embodiment of the present invention, a DNS in accordance with the teachings of the present invention includes a skewed lock prevention setting that may be activated or deactivated.

Figure 3:
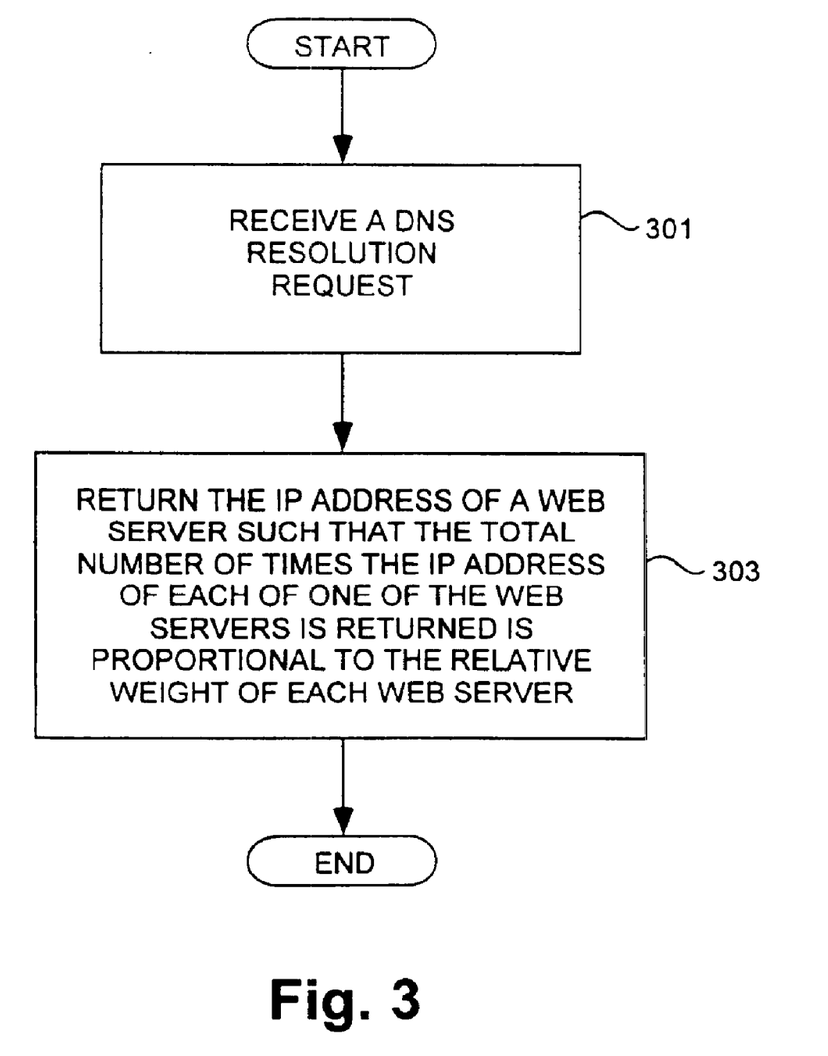
FIG. 3 is a flow diagram illustrating the operation of a DNS server with skewed lock prevention off in accordance with the teachings of one embodiment of the present invention.

FIG. 3 is a flow diagram that illustrates the processing steps of a DNS server returning IP addresses with skewed lock prevention deactivated. In step 301, the DNS receives a DNS resolution request. In step 303, the DNS returns the IP address of a web server such that the total number of times that the IP address of each one of the web servers is returned in proportional to the relative weight of each web server. In another embodiment, the DNS randomizes the list of web servers in a manner similar to existing DNS implementations, with the exception that the more powerful servers appear at the top of the list more often, proportional to their relative weights. To illustrate, if a first server is configured to be twice as powerful as a second server, the first server will appear at the top of the response list 67 percent of the time.

In another embodiment of the present invention, the DNS periodically determines whether each one of the web servers is not functioning properly or is generating time out errors. If a web server has crashed and is therefore unavailable to serve clients, the DNS discontinues providing the IP address of the down server to clients thereby providing improved service to the client with increased reliability. If the web server is generating time out errors, there is a possibility that the web server has become overburdened with serving client requests and the relative weight of that particular web server may thereby be reduced. In both instances, one embodiment of the present invention notifies the system administrators of the host so that the problems with the web servers may be corrected.

Figure 4:
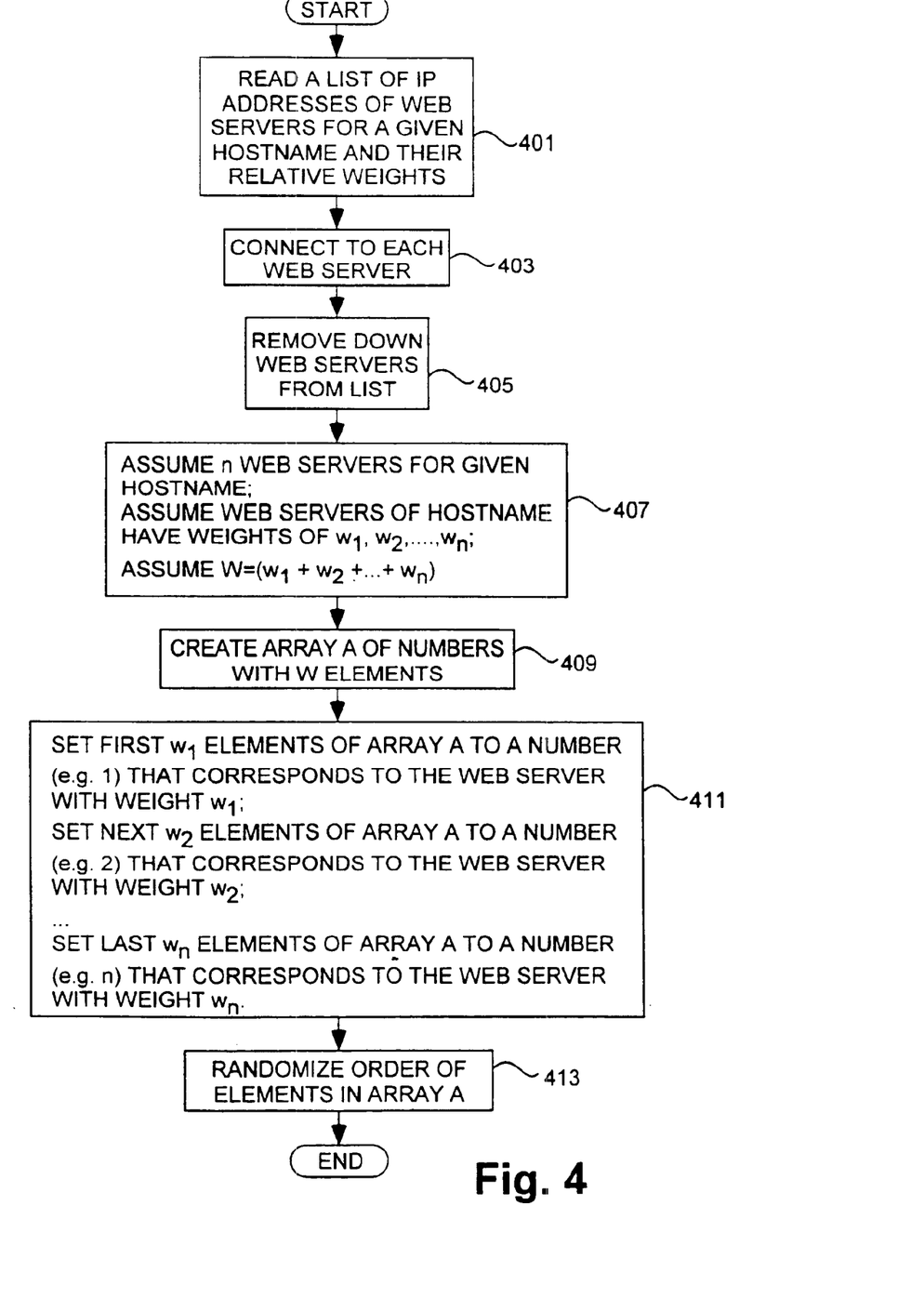
FIG. 4 is a flow diagram illustrating the initialization of internal arrays or tables of another embodiment of a DNS server with skewed lock prevention off in accordance with the teachings of one embodiment of the present invention.

FIG. 4 is a flow diagram illustrating the processing steps of another embodiment of the present invention with the skewed lock prevention setting deactivated. In step 401, the DNS reads a list of IP addresses of web servers for given host name and their relative weights, similar to Table 1 above. Next, the DNS connects to each web server and removes the down web servers from the list as shown in steps 403 and 405. Assuming that there are n web servers for a given host name and that each one of the n web servers have weights of $w_1, w_2, \ldots, w_n$, the total weight W equals $w_1+w_2+ \ldots +w_n$ as shown in steps 405 and 407.

Next, an array A of numbers with W elements is created. In one embodiment, the first $w_1$ elements of array A are assigned a number, such as for example 1, which corresponds to the web server with weight $w_1$. Then, the next $w_2$ elements of array A are set to a number, such as for example 2, which corresponds to the web server with weight $w_2$. This procedure continues for all n web servers. Assuming the web servers discussed in Table 1 above, array A would have twenty (6+7+7) elements, in which six of the elements are set to a number that corresponds to IP address 19.2.15.1, seven of the elements set to a number that corresponds to IP address 205.230.1.5 and seven of the elements set to a number corresponding to IP address 206.21.7.25. After array A has been created and the numbers set accordingly, the order of all of the elements and array A are randomized as shown in step 413. In one embodiment, array A is periodically recomputed as desired such that the lists of IP addresses with their relative weights remain current.

Figure 5:
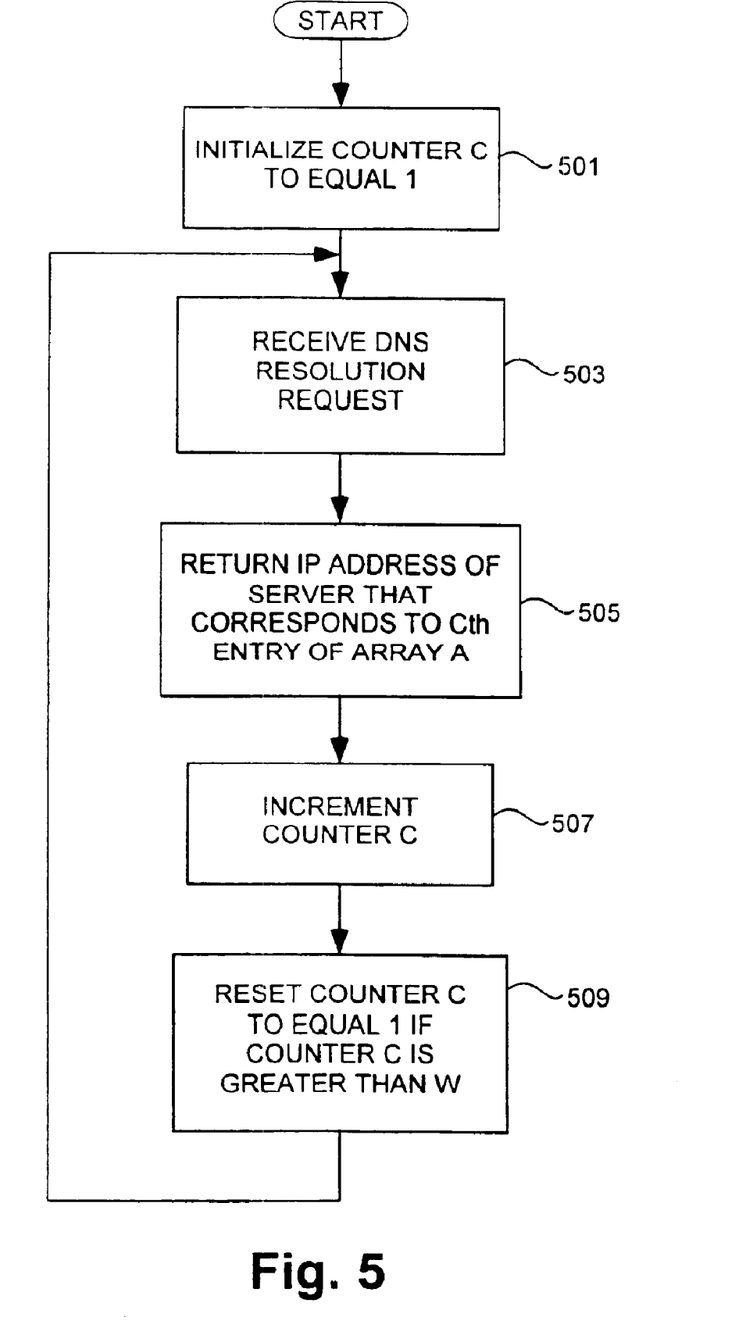
FIG. 5 is a flow diagram illustrating the operation of a DNS server serving client queries using the internal arrays or tables as initialized in FIG. 4 with skewed lock prevention off in accordance with the teachings of another embodiment of the present invention.

FIG. 5 is a flow diagram illustrating the processing steps performed by the DNS while utilizing array A as generated according to FIG. 4 and serving DNS resolution requests from the clients. As shown in step 501, counter C is initially set to equal 1. Then, DNS resolution requests are received from the client as shown in step 503. As shown in step 505, the DNS returns the IP address of the server that corresponds to the Cth entry of array A. Counter C is incremented as shown in step 507. If counter has been incremented to a value greater than W, counter C is then reset to equal 1 as shown in step 509. Afterwards, processing loops back to step 503 and subsequent DNS resolution requests are serviced accordingly. Each time array A is reconstructed according to FIG. 4, counter C is reinitialized to equal 1 according to step 501 and processing loops through steps 503–509 indefinitely.

If the skewed lock prevention setting in one embodiment of the present invention is activated, the DNS performs additional steps to attempt to balance the workload across multiple web servers of an Internet host. In one embodiment, the DNS periodically reads and processes the recent web server access logs to build a list of the top few client domains that have requested to be connected to one of the web servers of the Internet host. In one embodiment, the list includes the top m client domains that have connected to the web servers in the past few days. In one embodiment, a client domain is defined as a collection of clients of proxies that collectively cache DNS responses. An example of client domains include the large ISPs, which collectively provide Internet access to a large segment of the Internet community.

Table 2 below is an example of a list illustrating high traffic client domains, the number of accesses received from each of the client domains and the overall percentage of accesses from each client domain, as shown in columns 1–3 of Table 2.

TABLE 2

| Client Domain Name | Number of Accesses | Percentage of Accesses | IP Address Assignment |
|---|---|---|---|
| ISP_1.com | 483,889 | 35.1% | 19.2.15.1 |
| ISP_2.com | 282,613 | 20.5% | 205.230.1.5 |
| ISP_3.com | 261,934 | 19.0% | 206.21.7.25 |
| ISP_4.com | 128,210 | 9.3% | 206.21.7.25 |
| ISP_5.com | 86,852 | 6.3% | 205.230.1.5 |
| Others | 135,103 | 9.8% | Weighted Random |
| Total | 1,378,601 | 100.0% | |

Based on the data of Table 2, one embodiment of the present invention apportions the client domains among the multiple web servers of the Internet host such that the percentage of requests searched by each one of the web servers is proportional to the relative weight of each respective web server. Stated differently, one embodiment of the present invention apportions the client domains among the multiple web servers of the Internet host such that there is a reduced probability of a load imbalance between the web servers. As a result, the probability of each Internet service provider contacting the same web server due to skewed locking is reduced. As shown in column 4 of Table 2, the client domains are apportioned to different web servers and IP addresses such that the different web servers receive requests roughly proportional to their relative weights.

Figure 6:
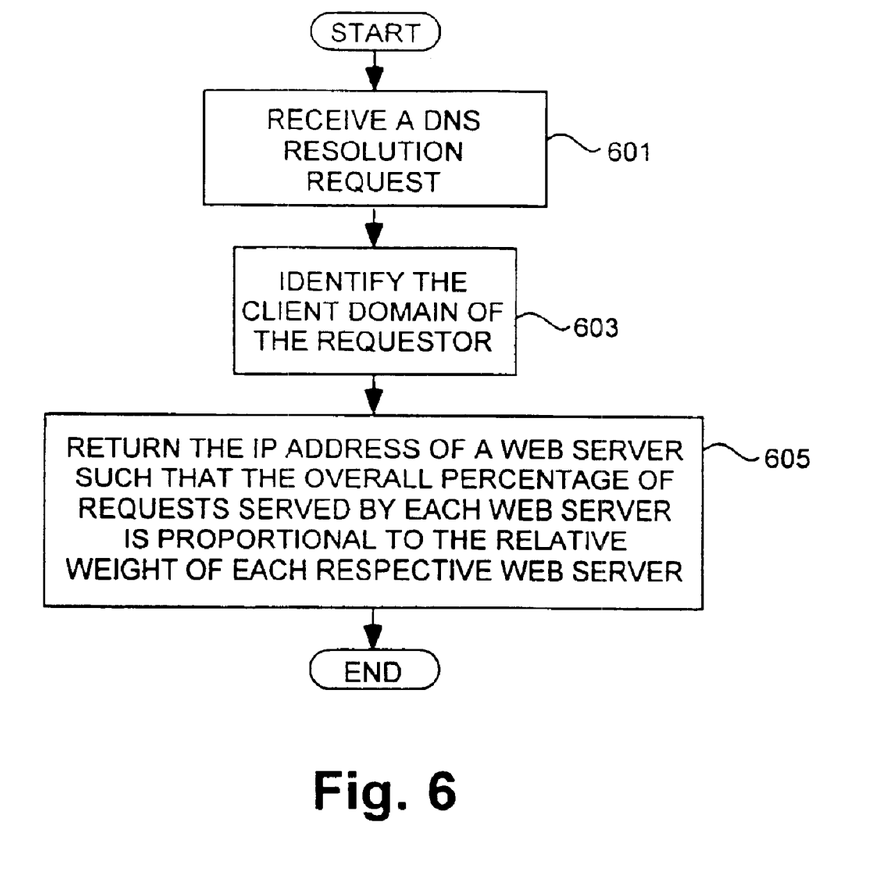
FIG. 6 is a flow diagram illustrating the operation of a DNS server with skewed lock prevention on in accordance with the teachings of one embodiment of the present invention.

FIG. 6 is a flow diagram illustrating the processing steps of a DNS server with the skewed lock prevention setting activated in accordance with the teachings of one embodiment of the present invention. As shown in step 601, a DNS resolution request is received by the DNS and the client domain of the requester is identified. Next, based on a list similar to Table 2, the DNS returns the IP address of the web server apportioned to the client domain such that the overall percentage of requests served by each web server is proportional to the relative weight of each respective web server.

Figure 7:
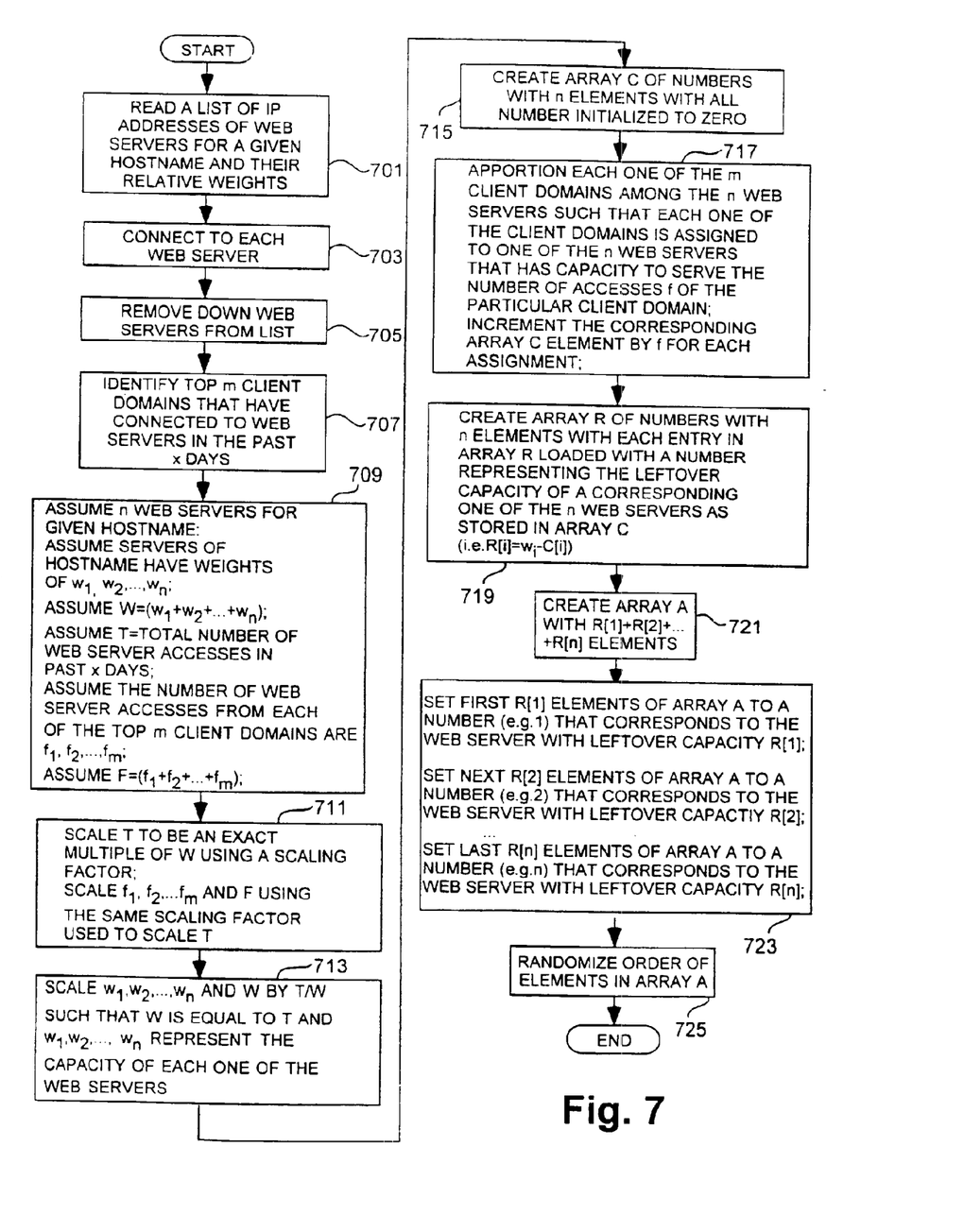
FIG. 7 is a flow diagram illustrating the initialization of internal arrays or tables of another embodiment of a DNS server with skewed lock prevention on in accordance with the teachings of the present invention.

FIG. 7 is a flow diagram illustrating the processing steps performed by one embodiment of the present invention to apportion the client domains among the multiple web servers of the Internet host, similar to the list shown in Table 2 above. The processing steps illustrated in FIG. 7 may be performed as often as desired to provide current information to client domains such that overall web server response time and performance are improved. As shown in FIG. 7, one embodiment of the present invention first reads a list of the IP addresses of the web servers for the Internet host and their relative weights, connects to each of the web servers and removes the down web servers from the list as illustrated in steps 701–705. Next, the top m client domains that have connected to the web servers in the past x days are identified. In one embodiment, the top 100 (m) client domains that have connected to the web servers in the past 2 days are identified. It is appreciated that greater or fewer than 100 client domains may be identified and that greater or fewer than days may be considered by another DNS server in accordance with the teachings of the present invention.

Next, it is assumed that there are n web servers for the given Internet host, each of each has relative weights of $w_1, w_2, \ldots, w_n$ and that the total weight W equals $w_1+w_2+ \ldots +W_n$. In addition, it is assumed that T equals the total number of web server accesses in the past x days and that the number of web server access from each of the top m client domains are $f_1, f_2, \ldots, f_m$ such that F, the total number of accesses from the top m client domains, equals $f_1+f_2+ \ldots +fm$, as shown in step 709. Next, T is scaled to be an exact integer multiple of W. F and $f_1, f_2, \ldots, f_m$ are also scaled using the same scaling factor that was used to scale T. Afterwards, W and $w_1, w_2, \ldots, w_n$ are scaled by T/W such that T at this point is equal to W and $w_1, w_2, \ldots w_n$ represent the load capacity of each respective web server, as shown in step 713.

Next, an array C of numbers with n elements is created. Each of the elements of array C initialized to 0, as shown in processing step 715. Array C is initialized in this manner such that each element represents the currently allocated load capacity of each of the respective web servers at a particular time during the apportioning process. In step 717, one embodiment of the present invention loops through each of the top m client domains and finds an element in array C containing a value that indicates that the corresponding web server still has remaining load capacity to service the number $(f_1, f_2, \ldots, f_m)$ of accesses from the particular top m client domain. For instance, if web server "y" has a relative weight $w_y$, and $w_y$ minus the contents of the yth element of array C is greater than or equal to the number of accesses $f_x$ from that particular client domain, then that particular web server "y" has the load capacity to service the number of accesses $f_x$ from that particular client domain. Thus, that client domain is apportioned to that particular web server in step 717. After this apportionment, the contents of the corresponding element in array C is then incremented by $f_x$. After processing step 717 is completed, all of the top m busiest client domains are assigned to one of the multiple web server, similar to the first five rows of Table 2 above.

The remaining leftover load capacity of the multiple web servers of the Internet host may now be distributed to the remaining client domains that were not identified as one of the top m client domains in step 701. This process is similar to the weighted random server assignment described in FIG. 4 with the skewed lock prevention setting deactivated. Accordingly, in one embodiment of the present invention, and array R of numbers with n elements is created. Each entry in array R is loaded with a number representing the leftover capacity of a corresponding one of the n web servers stored in array C, as shown in step 719. Stated differently, $R[i]=w_i-C[i]$. Thus, R[1] contains the leftover capacity of web server 1, R[2] contains the leftover capacity of web server 2, etc. Next, an array A is created with $R[1]+R[2]+ \ldots +R[n]$ elements. R[1] elements of array A are set to a number that corresponds to the web server with leftover capacity R[1], R[2] elements of array A are set to a number that corresponds to the web server with leftover capacity R[2], etc., as shown in step 723. Next, the order of the elements in array A are randomized, as shown in step 725.

Figure 8:
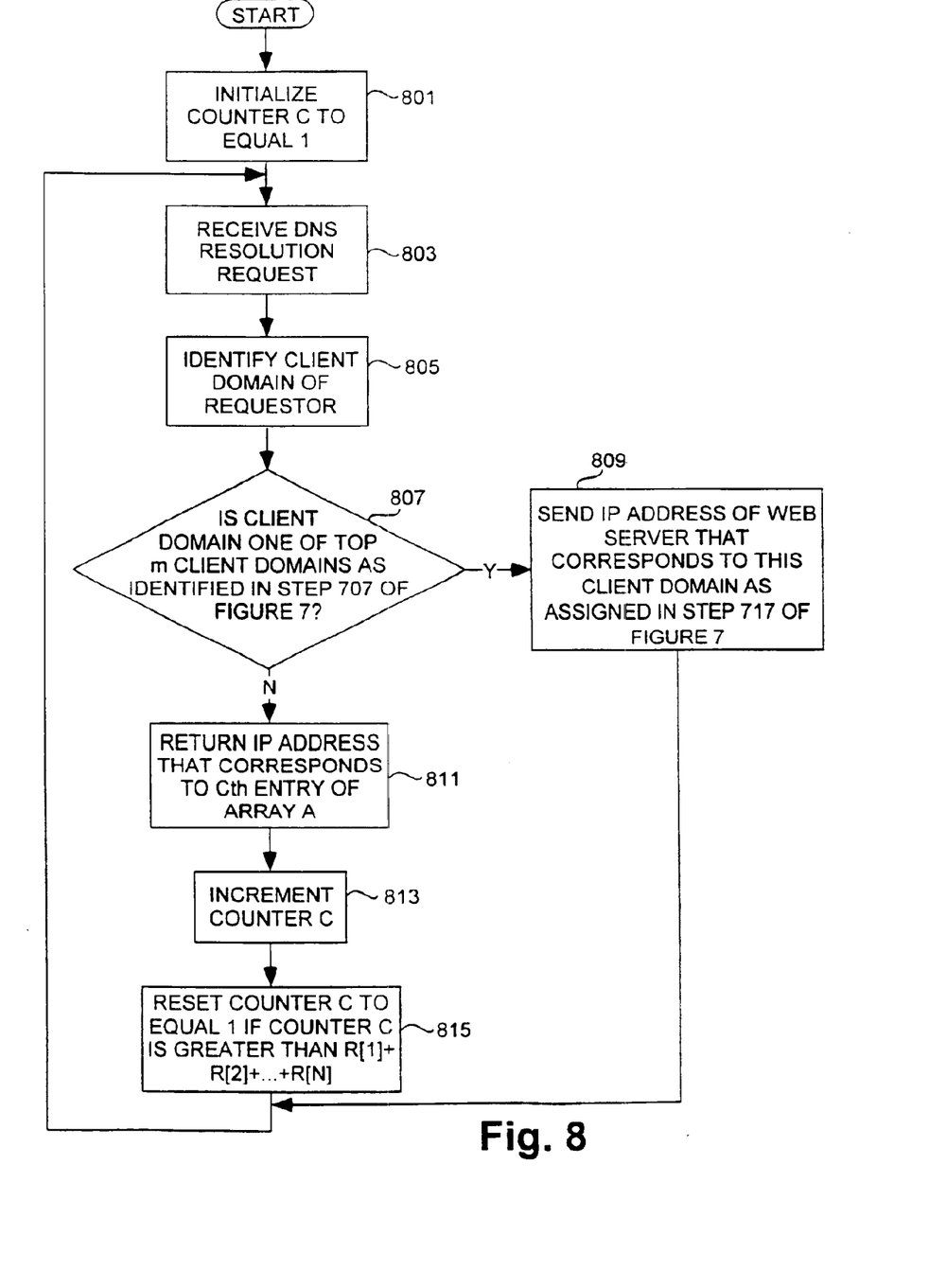
FIG. 8 is a flow diagram illustrating the operation of a DNS server serving client queries using the internal arrays or tables as initialized in FIG. 7 with skewed lock prevention on in accordance with the teachings of another embodiment of the present invention.

At this point, the arrays A and C for the DNS server are initialized for the skewed lock prevention setting activated. When serving requests, the flow diagram illustrated in FIG. 8 summarizes the processing steps performed to provide the IP addresses to the client domains utilizing arrays A and C as generated in FIG. 7. As shown in step 801, counter C is initialized to equal 1. Next, a DNS resolution request is received and the client domain of the requester is identified, as shown in steps 803 and 805. Next, it is determined whether the client domain is one of the top m client domains as identified in step 707 of FIG. 7. If so, the DNS server sends the IP address of the web server that corresponds to that particular client domain as assigned in step 717 of FIG. 7. If the client domain was not one of the top m client domains, then the DNS server returns the IP address that corresponds to the Cth entry of array A, as assigned in processing steps 723 and 725 of FIG. 7. Counter C is then incremented as shown in processing step 813 and counter C is reset to equal 1 if counter C is greater than $R(1)+R(2)+ \ldots +R(n)$. Processing is then looped back to step 803 for the next DNS resolution request to be received.

As discussed earlier, in one embodiment of the present invention, the DNS attempts a connection to the web servers periodically to determine whether each respective web server has crashed or is generating time out errors. In the event of a web server crash, the arrays A and C are rebuilt according to the processing steps illustrated in FIG. 7 to remove the faulty web server. In another embodiment of the present invention, a message identifying the faulty web server is also sent to the Internet host to inform the system administrator of the faulty web server. It is noted that the message may be sent to the Internet host using e-mail, pagers, or other well known techniques.

Figure 9:
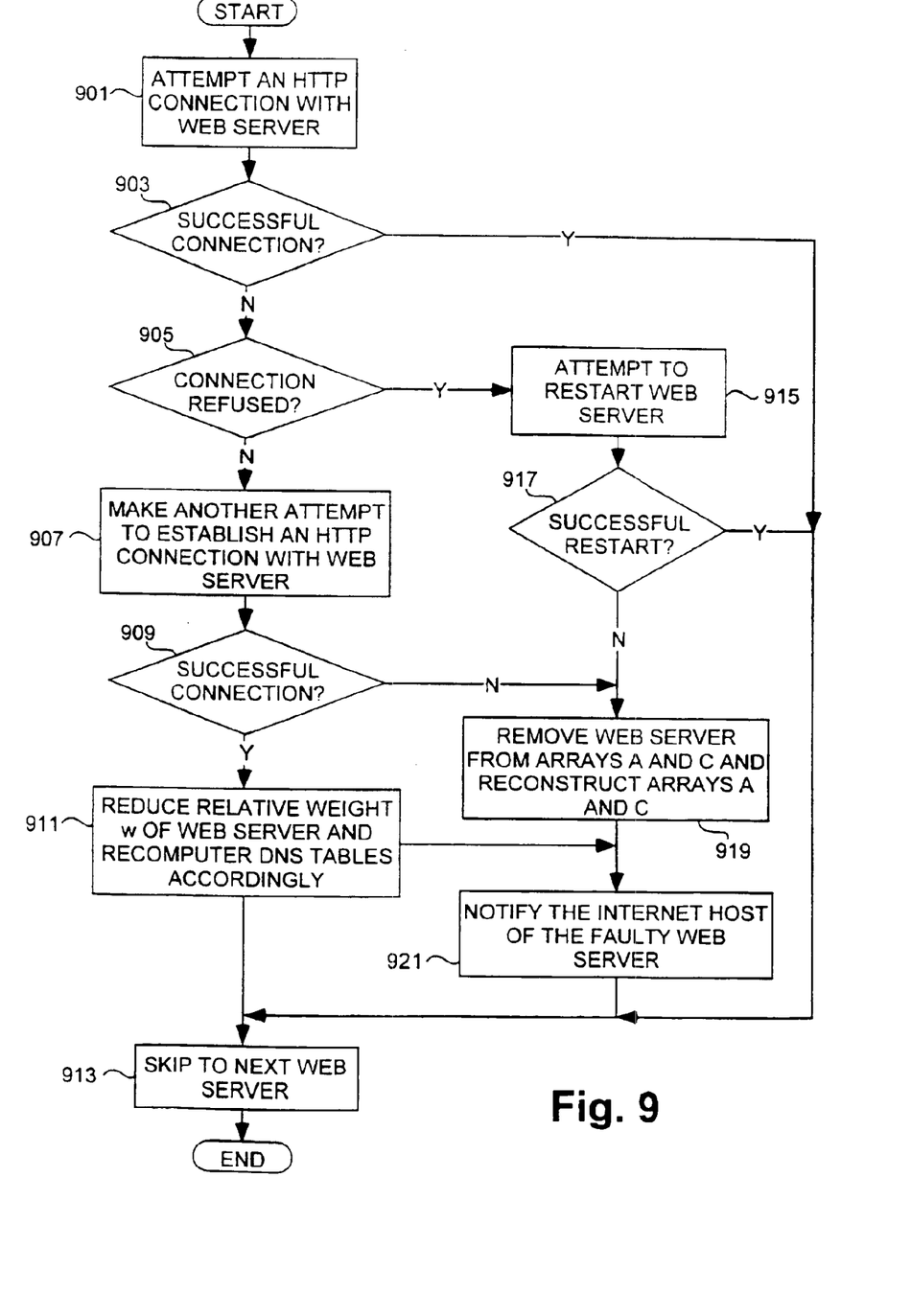
FIG. 9 is a flow diagram illustrating the operation of a DNS server verifying that the web servers are not down and are not generating time out errors in accordance with the teachings of another embodiment of the present invention.

FIG. 9 is a flow diagram illustrating the processing steps performed by one embodiment of the present invention to periodically check for faulty web servers. By detecting faulty web servers in a timely manner, overall Internet response time and reliability is improved in accordance with the teachings of the present invention. As shown in FIG. 9, an HTTP connection with one of the web servers is attempted in step 901. If the HTTP connection is successful, then processing proceeds to step 913 where the DNS skips to the next web server. If, however, the HTTP connection is not successful, then it is determined whether the connection was refused, as shown in step 905. If so, then this web server has probably crashed and an attempt is made to restart the web server as shown in step 915. If the restart operation of step 915 is not successful, then the web server is removed from arrays A and C and the arrays are recomputed according to the steps shown in FIG. 7. In addition, the Internet host is notified with the corresponding information regarding the faulty web server as shown in steps 919 and 921. If the restart operation of step 915 is successful, then there is no need to remove the web server from arrays A and C and processing proceeds to the next web server as shown in step 913.

In the event that the connection attempt of step 903 was not refused, then it is assumed that there was a time out error and another attempt to establish an HTTP connection with the web server is made in step 907. If there still is no successful connection, then it is assumed that the web server is down and that web server is then removed from arrays A and C in step 919. The Internet host is then notified of the faulty web server in step 921. If there was a successful connection after the second attempt to establish the HTTP connection with the web server, then it is assumed that this particular server is overburdened, which explains the time out error. As a result, the relative weight of that web server is reduced and the DNS tables are recomputed accordingly, as shown in step 911. Afterwards, processing proceeds to the next web server as indicated in processing step 913.

Thus, what has been described is an improved method for providing IP addresses with a DNS server for multiple web servers. With the presently described method, the workload between multiple servers is more evenly distributed. In addition, the present invention provides a fault tolerant, network friendly, self-learning DNS server that reduces the probability of major ISPs from locking onto a single web server.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An Internet domain name server (DNS) apparatus comprising:
    first processing logic to identify a plurality of client domains that have recently requested to be connected to a plurality of servers;
    second processing logic to apportion the plurality of client domains among the plurality of servers such that a percentage at requests served by each one of the plurality of servers is proportional to a relative weight of each respective one of the plurality of servers;
    a first interface to receive a DNS resolution request from one of the plurality of client domains; and
    a second interface to return an IP address of one of the plurality of servers to which the one of the client domains was apportioned.

2. The apparatus as claimed in claim 1, wherein the second processing logic periodically determines whether each one of the plurality of servers is down, sets to zero the relative weight of each one of the plurality of servers that is down and recalculates a total weight of the plurality of servers.

3. The apparatus as claimed in claim 2, wherein the second processing logic notifying an Internet host of each one of the plurality of servers that is down.

4. The apparatus as claimed in claim 1, wherein the second processing logic periodically determining whether each one of the plurality of servers is generating a time out error, reducing the relative weight of each one of the plurality of servers that generate the time out error, and recalculating a total weight of the plurality of servers.

5. The apparatus as claimed in claim 4, wherein the second processing logic notifies an Internet host of each one of the plurality of servers that is generating the time out error.

6. The apparatus as claimed in claim 1, wherein the second processing logic apportions the plurality of client domains among the plurality of servers by identifying a number of times each one of the plurality of client domains has recently requested being connected to the plurality of servers.

7. The apparatus as claimed in claim 1, wherein the second processing logic identifies a number of times each one of the plurality of client domains has recently requested being connected to the plurality of servers by reading a recent server log of an Internet host.

8. The apparatus as claimed in claim 1, wherein the IP address of the one of the plurality of servers to which the one of the client domains was apportioned is returned to a first requesting client in a list including IP addresses of other ones of the plurality of servers such that the IP address of the one of the plurality of servers to which the one of the client domains was apportioned is at a top of the list.

9. The apparatus as claimed in claim 1, wherein the first processing logic receives a DNS resolution request from a second requesting client of a client domain not included in the plurality of client domains that have recently requested to be connected to the plurality of servers, and the second processing logic returns to the second requesting client an IP address of a first one of the plurality of servers such that a total number of times that the IP address of the first one of the plurality of servers is returned is proportional to a leftover capacity of the first one of the plurality of servers relative to a total leftover capacity of the plurality servers.

10. The apparatus as claimed in claim 1, wherein the plurality of client domains that have recently requested to be connected to the plurality of servers include client domains that have recently frequently requested to be connected to the plurality of servers.

11. An Internet domain name server (DNS) apparatus comprising:
    a first interface to receive a DNS resolution request; and
    a second interface to return an IP address of a first one of a plurality of servers such that a total number of times that the IP address of the first one of the plurality of servers is returned is proportional to a relative weight of the first one of the plurality of servers relative to a total weight of the plurality of servers.

12. The apparatus claimed in claim 11, wherein the second interface periodically determines whether each one of the plurality of servers is down and sets to zero the relative weight of each one of the plurality of servers that is down and recalculates the total weight of the plurality of servers.

13. The apparatus claimed in claim 12, wherein the second interface informs an Internet host of each one of the plurality of servers that is down.

14. The apparatus claimed in claim 11, wherein the second interface periodically determines whether each one of the plurality of servers is generating a time out error, then correspondingly reduces the relative weight of each one of the plurality of servers that generate the time out error, and recalculates the total weight of the plurality of servers.

15. The apparatus claimed in claim 14, wherein the second interface notifies an Internet host of each one of the plurality of servers that is generating the time out error.

16. The apparatus claimed in claim 11, wherein the IP address of the first one of the plurality of servers is returned to a first one of a plurality of clients in a list including IP addresses of other ones of the plurality of servers such that a total number of times that the IP address of the first one of the plurality of servers is at a top of the list when the list is returned to the plurality of clients is proportional to the relative weight of the first one of the plurality of servers relative to the total weight of the plurality servers.

17. A domain name server (DNS) apparatus including processing logic to:
   determine a relative weight for each one of a plurality of servers;
   calculate a total weight of the plurality of servers identifying a plurality of client domains that have recently frequently requested to be connected to the plurality of servers;
   identify a number of times each one of the plurality of client domains has recently connected to the plurality of servers;
   calculate a total number of times the plurality of servers has been connected to the plurality of client domains;
   apportion the plurality of client domains among the plurality of servers such that the relative weight of a first one of the plurality of servers in comparison to the total weight of the plurality servers is approximately proportional to a cumulative number of times each one of the plurality of client domains apportioned to the first one of the plurality of servers has recently connected to the plurality of servers in comparison to the total number of times the plurality of servers has been connected to the plurality of client domains;
   receive a DNS resolution request from a first requesting client of one of the plurality of client domains;
   identify said one of the plurality of client domains in which the first requesting client is included; and
   return to the first requesting client an IP address of one of the plurality of servers to which said the one of the client domains was apportioned.

18. The apparatus as claimed in claim 17, wherein the processing logic receives a DNS resolution request from a second requesting client of a client domain not included in the plurality of client domains that have recently frequently requested to be connected to the plurality of servers, and returns to the second requesting client an IP address of the first one of the plurality of servers such that a total number of times that the IP address of the first one of the plurality of servers is returned is proportional to a leftover capacity of the first one of the plurality of servers relative to a total leftover capacity of the plurality of servers.

19. The apparatus as claimed in claim 17, wherein the processing logic periodically determines whether each one of the plurality of servers is down, sets to zero the relative weight of each one of the plurality of servers that is down, and recalculates the total weight of the plurality of servers.

20. The apparatus as claimed in claim 17, wherein the processing logic periodically determines whether each one of the plurality of servers is generating a time out error, reduces the relative weight of each one of the plurality of servers that generate the time out error, and recalculates the total weight of the plurality of servers.

\* \* \* \* \*